United States Patent [19]

Newman

[11] 3,985,832

[45] Oct. 12, 1976

[54] METHOD OF COVULCANIZING CHLORINATED LOW UNSATURATION RUBBERS WITH HIGH UNSATURATION RUBBER

[75] Inventor: Neil F. Newman, Edison, N.J.

[73] Assignee: Exxon Research and Engineering Company, Linden, N.J.

[22] Filed: Jan. 2, 1975

[21] Appl. No.: 537,857

[52] U.S. Cl. .............................. 260/888; 526/296
[51] Int. Cl.$^2$ .................. C08L 9/00; C08L 23/28; C08C 19/32
[58] Field of Search ............... 260/85.3 C, 85.3 H, 260/888

[56] References Cited
UNITED STATES PATENTS

| | | | |
|---|---|---|---|
| 2,965,600 | 12/1960 | Minckler, Jr. et al. | 260/85.3 H |
| 2,975,816 | 3/1961 | Ford et al. | 260/85.3 C |
| 3,036,986 | 5/1962 | O'Connor et al. | 260/888 |
| 3,051,680 | 8/1962 | Minckler, Jr. et al. | 260/888 |
| 3,779,979 | 12/1973 | Tsuchiya | 260/85.3 H |
| 3,808,295 | 4/1974 | Kent et al. | 260/888 |
| 3,865,763 | 2/1975 | Feniak | 260/85.3 C |

Primary Examiner—Alan Holler
Attorney, Agent, or Firm—Henry E. Naylor

[57] ABSTRACT

Disclosed are chlorinated low unsaturation rubbers exhibiting improved adhesion properties and improved covulcanization ability with high unsaturation rubbers. Also disclosed is a method of preparing these rubbers which comprises reacting the chlorinated rubber with certain bromine and/or iodine containing compounds.

17 Claims, No Drawings

METHOD OF COVULCANIZING CHLORINATED LOW UNSATURATION RUBBERS WITH HIGH UNSATURATION RUBBER

BACKGROUND OF THE INVENTION

This invention relates to chlorinated low unsaturation rubbers having both improved adhesion properties and also improved covulcanizability with high unsaturation rubbers and a method for making same.

Chlorobutyl rubber possesses many desirable properties such as exceptionally good air impermeability, flex properties and especially good heat resistance and aging properties. The commercial success of chlorobutyl rubber is largely dependent on its application in such things as tire innerliners and sidewalls, conveyor or power transmission belting, steam hoses, wire insulation, etc. Chlorobutyl rubber has proved to be useful in applications inaccessible to butyl rubber owing to the fact that the chlorinated sites of chlorobutyl enhance covulcanization of chlorobutyl with high unsaturation rubbers. Even with this improved covulcanization, it has long been recognized that the degree of covulcanization of chlorobutyl with high unsaturation rubber was not complete enough to allow for the use of chlorobutyl with high unsaturation rubber in all of the applications where its desirable properties would be advantageous. The properties which had to be improved before chlorobutyl could be effectively covulcanized with certain high unsaturation rubber for such uses as high performance tire innerliners and sidewalls were (1) the adhesion of chlorobutyl vulcanizates to high unsaturation rubber vulcanizates, and (2) improved tensile strength and dynamic stability of covulcanizates of chlorobutyl with high unsaturation rubber.

It has long been known in the art that the adhesion of chlorobutyl to high unsaturation rubber could be improved by the addition of small amounts of bromobutyl rubber to chlorobutyl rubber. Such a technique is disclosed in U.S. Pat. No. 2,992,670, wherein a minor proportion of bromobutyl is blended with a major proportion of chlorobutyl in order to improve the adhesion properties of chlorobutyl with high unsaturation rubber.

Another technique for improving the adhesion properties of chlorobutyl with high unsaturation rubber is disclosed in U.S. Pat. No. 2,933,117, which teaches that a chlorinated butyl inner lining of a tubeless tire can be adhered to a carcass containing one or more high unsaturation rubbers by the introduction of an interposed layer containing an admixture of a high unsaturation rubber and a brominated butyl rubber.

Still another technique for adhering chlorobutyl to a high unsaturation rubber is disclosed in U.S. Pat. No. 2,975,816, wherein a laminated rubber structure was prepared which consisted of:

1. an inner lining of chlorobutyl and a high unsaturation rubber modified with certain N-bromo compounds;
2. a carcass layer containing one or more high unsaturation rubbers modified with a N-bromo compound, and
3. an outer rubber layer containing at least one rubber polymer.

SUMMARY OF THE INVENTION

It has now surprisingly been found that the compatibility and covulcanizability of chlorobutyl with a high unsaturation rubber can be greatly improved without the need for blending a chlorobutyl rubber with a bromobutyl rubber. Such an improvement is accomplished by the addition of certain bromine or iodine-containing compounds. These bromine or iodine-containing compounds can be either inorganic or organic. If inorganic, they are preferably in the form of a Lewis acid, e.g., aluminum bromide. If organic, the bromine or iodine is preferably bonded to a carbon artom which in turn is bonded to one to three functional groups which are capable of stabilizing a positive charge at the bromine-bonded carbon. Illustrative of such groups are nitrile, carbonyl, aryl, vinyl, etc.

DETAILED DESCRIPTION

The expression "butyl rubber" as employed in this specification is well known in the art and is intended to include those copolymers made from a polymerization reaction mixture having therein from about 70 to about 99.5% by weight of an isoolefin, which has about 4 to about 7 carbon atoms (e.g., isobutylene) and about 30 to about 0.5% by weight of a conjugated multiolefin having from about 4 to about 14 carbon atoms, e.g., isoprene. The resulting copolymer contains about 85 to about 99.5% by weight of combined isoolefin and about 0.5 to about 15% of combined multiolefin. The preparation of butyl rubber is well known in the art, and therefore a detailed description of its preparation is not included in this specification. The preparation of butyl rubber is disclosed in U.S. Pat. No. 2,356,128 which is incorporated herein by reference.

The term "chlorobutyl" as used in the specification and claims means a halogenated butyl rubber wherein the halogen is chlorine. Chlorobutyl rubber is commercially available and may be prepared by chlorinating butyl rubber in a solution containing between 1 to 60% by weight of butyl rubber in a substantially inert $C_5$–$C_8$ hydrocarbon solvent such as pentane, hexane, heptane, etc. and contacting this butyl rubber cement with chlorine gas for about 2 secs. to about 25 mins. whereby chlorobutyl rubber and hydrogen halide are formed, the polymer containing up to one or more halogen atoms per double bond initially present in the polymer. The preparation of chlorobutyl rubber is old in the art, see e.g. U.S. Pat. No. 3,099,644, which is incorporated herein by reference. This invention is not intended to be limited in any way by the manner in which butyl rubber is chlorinated.

In general any chlorobutyl rubber can be used. Illustrative of the chlorobutyl rubber used in this invention is a chlorinated butyl rubber which before chlorination analyzes 1.8 mole % unsaturation and a viscosity average molecular weight of about 450,000. The high molecular weight butyl rubber starting material contained from about 0.5 to about 6% of combined diolefin.

The term "high unsaturation rubber" as used in the specification and claims means those rubbers containing at least 30 mole % unsaturation. Illustrative of such rubbers are natural rubber, styrene-butadiene rubber, polybutadiene, polyisoprene, and polychloroprene and mixtures thereof.

It will be evident to those skilled in the art that the scope of this invention includes other chlorinated low unsaturation rubbers wherein the amount of unsaturation is less than 30 mole % and the viscosity average molecular weight is about 10,000 to 1,000,000. Illustrative of such an elastomer would be chlorinated EPDM. Methods for preparing chlorinated EPDM are well known in the art; said EPDM may be prepared by reacting an EPDM consisting of ethylene, an alpha-olefin other than ethylene and a small amount of non-conjugated diolefin with a chlorinated hydrocarbon such as carbon tetrachloride, chloroform, trichloroethylene, tetrachloroethylene or monochlorobenzene in the presence or absence of a free radical initiator, e.g., UV light, chemical initiators, etc.

Illustrative of a chlorinated EPDM suitable for use in this invention is one having the following properties: ethylene content, 48 wt. %; ethylene norbornene content, 9 wt. %; a chlorine content of 0.65 wt. % and having an iodine number of 18.6 and a Mooney Viscosity ML 260 of 67.

Organic bromine and iodine compounds suitable for use in this invention are preferably $C_1$ to $C_{30}$ and more preferably $C_1$ to $C_{20}$ compounds wherein the bromine or iodine is bonded to a carbon atom which also has bonded thereto, two or three additional groups wherein at least one of the groups is a functional group capable of stabilizing a positive charge at the halogen-bonded carbon. Illustrative of groups capable of stabilizing said positive charge and suitable for use in this invention include (but are not limited to) nitrile, carboxyl, aryl, vinyl and carbonyl. Groups other than the halogen and stabilizing groups which may also be attached to the halogen-bonded carbon may be any of the non-electron withdrawing groups. Illustrative of such groups suitable for use in this invention are aliphatic groups, double bonded oxygen, hydrogen and an additional bromine.

Illustrative of organic bromine-containing compounds suitable for use in this invention include (but is not limited to) α-bromoacetophenone, bromodiphenylmethane, 9-bromofluorene, diethyl bromomalonate, benzoyl bromide, cinnamyl bromide, 1,4-dibromo-2-butene, bromoacetic acid, 1,4-dibromo-2,3-butanedione, diethyl dibromomalonate, dibromoacetonitrile, tribromoacetaldehyde, α-bromoisobutyrophenone, ethyl 2-bromoisobutyrate, $\alpha,\alpha,\alpha',\alpha'$ tetrabromo σ-xylene and 9,10-dibromoanthracene. Preferred are diethyl bromomalonate, bromoacetic acid and cinnamyl bromide.

Organic iodine-containing compounds which are suitable for use in this invention include (but are not limited to) α-iodoacetophenone, iodoacetic acid, cinnamyl iodide.

Also within the scope of this invention are organic compounds similar to those above but which contain both iodine and bromine atoms.

It has also been found that certain types of bromine-containing inorganic compounds are suitable for use in this invention. Such inorganic compounds are preferably Lewis acids such as aluminum bromide and zinc bromide. When an inorganic bromine-containing compound is used which cannot be directly dispersed in the rubberblend because of the compound's high melting point, it is preferred that such a bromine containing compound be first dissolved in a suitable solvent before its introduction into the rubber blend. Illustrative of such suitable solvents would be water and oxygenated hydrocarbons such as ethers, esters and alcohols. An example of such a solution would be a 33% by weight solution of zinc bromide in isopropanol.

An advantage of this invention is that it increases the utility of chlorobutyl rubber so that it can be used in applications in which bromobutyl rubber has been advantageous because of its more rapid cure. One such application would be in molded products such as pharmaceutical stoppers. Often bromobutyl rubber as opposed to chlorobutyl rubber is used in the production of such stoppers owing to the fact that bromobutyl has a faster cure rate than chlorobutyl thus leading to a higher production rate. But by using bromobutyl rubber for such applications, an occupational hazard may also be created in view of the fact that bromine may be introduced into the working environment. By means of this invention one is able to obtain as fast a cure rate with the bromine modified chlorobutyl as with bromobutyl. The occupational hazard created by use of bromobutyl is also reduced owing to the fact that chlorobutyl dehydrochlorinates at a much slower rate than bromobutyl dehydrobrominates.

The compositions of this invention may be compounded by conventional compounding methods known in the art. In general the chlorinated low unsaturation rubber and/or high unsaturation rubber is mixed in a conventional mixer, although a banbury mixer is preferred, at about 75° C to about 250° C for about 1 to about 10 minutes. More preferred is a temperature of about 100° C to about 200° C for about 3 to about 8 minutes and most preferred is a temperature of about 150° C for about 6 minutes. The rubber composition is then milled with the bromine or iodine containing compound preferably at a temperature of about 0° C to about 100° C for a time long enough to completely mix the composition. More preferred is a temperature of about 20° C to about 50° C for about 1 to about 5 minutes.

The amount of bromine or iodine containing compound required will vary with the amount of chlorobutyl rubber. Preferably enough bromine or iodine containing compound is used so as to provide from about 0.125 moles of bromine or iodine to about 1 mole of bromine or iodine per mole of chlorine present in the chlorobutyl rubber. More preferred is about 0.250 moles to about 0.500 moles of bromine or iodine present per mole of chlorine.

It will also be evident to those skilled in the art that conventional rubber compounding materials may be used in the practice of this invention. Illustrative of such conventional compounding materials suitable for use in this invention would be fillers, oils, accelerators, etc.

Also within the scope of this invention is a method of improving the adhesion of chlorinated low unsaturated rubbers to high unsaturated rubbers wherein the interfacial surfaces of said rubbers are treated with a bromine or iodine containing composition. The bromine or iodine containing compounds are those previously described and may be applied in solution, paste or other appropriate means.

This invention will be more fully illustrated by the following examples.

EXAMPLE 1

Both chlorobutyl rubber and natural rubber were each compounded with fillers and plasticizers in a Banbury for 6 minutes at 149° C. The compounds were then transferred to a rubber mill wherein zinc oxide, sulfur and accelerators were added and milled. The materials were then press cured for 30 minutes at 153° C. Formulation data is found in Tables I and II below.

The chlorobutyl compound was tested by conventional means for % elongation, tensile strength and 300% modulus; the results are found at the end of Table I.

The two rubber compounds were adhered together and a strip adhesion test (ASTM D413-38) was performed; the results are listed in Table III below.

TABLE I

| Chlorobutyl Rubber Compound | Parts per Hundred |
|---|---|
| Chlorobutyl | 100.0 |
| Regal 300 (HAF Block) | 25.0 |
| MT (Medium Thermal Furnace Block) | 75.0 |
| Stearic Acid | 1.0 |
| Amberol ST 137 × (1) | 4.0 |
| Flexon 840 oil (Plasticizer) | 6.0 |
| Sunolite 127 Wax | 2.0 |
| Zinc Oxide | 5.0 |
| Sulfur | 1.5 |
| Mercaptobenzothiazyl disulfide (MBTS) | 1.0 |
| Properties | |
| 300% Modulus, psi | 800.0 |
| Tensile Strength, psi | 1300.0 |
| Elongation, % | 550.0 |
| Mooney Scorch at 132°C. (minutes to 10 point rise) | 10.2 |

(1) phenol-formaldehyde resin

TABLE II

| Natural Rubber Blend | Parts per Hundred |
|---|---|
| RSS No. 1 (1) | 100.0 |
| SRF Black | 50.0 |
| Flexon 580 oil (Plasticizer) | 5.0 |
| BLE-25 (2) | 1.5 |
| Stearic Acid | 1.5 |
| Zinc Oxide | 5.0 |
| Santocure (3) | 1.2 |
| Tetramethyl thiuram disulfide (TMTDS) | 0.1 |
| Sulfur | 2.5 |

(1) Ribbed smoked sheet — natural rubber
(2) High temperature reaction product of diphenylamine and acetone
(3) N-cyclohexyl-2-benzo thiazolesulfenamide

TABLE III

Adhesion of Chlorobutyl to Natural Rubber Blend

| lbs/inch at 24°C. | 48 Interfacial separation |
|---|---|
| lbs/inch at 121°C. | 5 Interfacial separation |

The above data illustrates the non-compatibility of chlorobutyl with a natural rubber blend. In view of the poor adhesion qualities of chlorobutyl with natural rubber, such a combination would be unacceptable for such uses as high performance tire construction.

EXAMPLES 2-9

A chlorobutyl rubber composition was prepared as in Example 1 except that bromine-containing compounds were introduced during the milling stage. The bromine-containing chlorobutyl was adhered to the natural rubber formulation of Example 1 and ASTM D413-38 strip-adhesion tests were performed. The following is a table illustrating some of the bromine-containing compounds suitable for use in this invention and their ability to enhance the compatibility of chlorobutyl with high unsaturation rubber compositions.

TABLE IV

Effects of Selected Bromine-Containing Compounds on the Compatability of Chlorobutyl with Natural Rubber

| Ex. | Bromine Compound | Mole of Br to Mole of Cl | 300% Modulus psi | Tensile Strength psi | Elongation % | Adhesion to NR at 24°C. | Adhesion to NR at 121°C. | Mooney Scorch at 132°C.(2) |
|---|---|---|---|---|---|---|---|---|
| 2 | 1,4-dibromo-2,3-butanedione | 0.5 | 950 | 1100 | 350 | 52T | 38T | 2.6 |
|  |  | 0.25 | 1000 | 1250 | 400 | 70I | 43T | 3.8 |
|  |  | 0.125 | 1000 | 1300 | 450 | 90T | 9I | 5.0 |
| 3 | Diethyl Bromomalonate | 0.5 | 550 | 1000 | 600 | 120T | 68T | 6.6 |
|  |  | 0.25 | 700 | 1100 | 600 | 170T | 80T | 7.1 |
|  |  | 0.125 | 780 | 1200 | 500 | 70I,T | 4-I | 6.4 |
| 4 | α-bromoacetophenone | 0.5 | 650 | 1000 | 600 | 165T | 75T | 5.4 |
|  |  | 0.25 | 850 | 1200 | 550 | 125T | 80T | 6.2 |
|  |  | 0.125 | 880 | 1250 | 500 | 80I,T | 9-I | 7.0 |
| 5 | Bromoacetic Acid | 0.5 | 750 | 1000 | 500 | 118T | 65T | 4.8 |
|  |  | 0.25 | 850 | 1100 | 550 | 90I | 58T | 5.2 |
|  |  | 0.125 | 930 | 1200 | 500 | 73T | 4I | 7.8 |
| 6 | Cinnamyl bromide | 0.5 | 900 | 1150 | 400 | 105T | 50T | 1.7 |
|  |  | 0.25 | 950 | 1300 | 530 | 75I | 50T | 4.8 |
|  |  | 0.125 | 930 | 1330 | 400 | 90I,T | 13I,T | 4.8 |
| 7 | 1,4-dibromo-2-butene | 0.5 | 1000 | 1250 | 450 | 82T | 60T | 7.0 |
|  |  | 0.25 | 900 | 1200 | 500 | 120T | 38T | 9.4 |
|  |  | 0.125 | 1000 | 1330 | 500 | 44I | 7I | 8.4 |
| 8 | Zinc bromide(1) | 0.5 | 1200 | 1350 | 400 | — | — | <2.0 |
|  |  | 0.25 | 1050 | 1300 | 450 | 130-T | 50-T | 2.0 |
|  |  | 0.125 | 880 | 1380 | 500 | 95I,T | 6-I | 5.8 |
| 9 | Aluminum Bromide | 0.5 | 950 | 1250 | 450 | 105T | 60T | 2.0 |

(1) dissolved in isopropanol to give a 33% by weight solution;
(2) minutes to 10 point rise
I = Interfacial separation (not desirable)
T = Stock Tearing (desirable)

The above table shows that the compatability of chlorobutyl with high unsaturation rubber compositions can be increased with the use of selected bromine-containing organic and inorganic compounds. The above table also illustrates that as the mole ratio of bromine to chlorine in the chlorobutyl is decreased, the adhesion property of bromine-containing chlorobutyl to natural rubber decreases. As shown above, it is preferred that the mole ratio of bromine to chlorine not fall substantially below 0.125 mole of bromine per mole of chlorine.

Also indicated by this table is the fact that the addition of bromine-containing compounds to chlorobutyl significantly decreases the Mooney Scorch time. This shows that the addition of these bromine-containing compounds gives a faster cure rate than chlorobutyl alone.

EXAMPLE 10

Rubber compositions were prepared according to Example 2 except that an iodine-containing compound as opposed to a bromine-containing compound was reacted with the chlorobutyl during milling. The following is a table illustrating the suitability of one such iodine compound for use in the present invention.

TABLE V

Effect of Iodoacetic Acid on the Compatibility of Chlorobutyl with Natural Rubber
0.25 Moles of Iodine per Mole of Chlorine

| 300% Modulus psi | Tensile Strength psi | Elongation % | Adhesion to NR at 24°C. lbs/inch | Adhesion to NR at 121°C. lbs/inch |
|---|---|---|---|---|
| 750 | 1200 | 500 | 65-T | 25-T |

TABLE VII

Tensile Strength and Dynamic Stability of Chlorobutyl/ Natural Rubber Vulcanizate

| | |
|---|---|
| 300% Modulus, psi | 990 |
| Tensile Strength, psi | 1850 |
| Elongation % | 500 |
| Kilocycles to rupture[1] | 31 |

[1]Monsanto fatigue-to-fatigue test at a nominal 140% extension

EXAMPLES 12-19

Chlorobutyl/natural rubber compositions of Example 11 were prepared except that certain bromine-containing compounds were introduced during the milling stage. After curing, tensile strength and dynamic stability data were obtained by conventional means, and the data for these bromine-containing compositions are found in Table VIII below.

TABLE VIII

Effect of Selected Bromine Containing Compounds on Tensile Strength and Dynamic Stability of Chlorobutyl/Natural Rubber Blend

| Ex. | Bromine Compound | Moles of Br to Moles of Cl | 300% Modulus, psi | Tensile Strength psi | Elongation % | Kilocycles to Rupture |
|---|---|---|---|---|---|---|
| 12 | 1,4-dibromo-2,3-butanedione | 0.50 | 850 | 2250 | 550 | 71 |
| | | 0.25 | 1100 | 2400 | 550 | 57 |
| | | 0.125 | 1000 | 2000 | 500 | 49 |
| 13 | Diethyl Bromomalonate | 0.50 | 900 | 2550 | 650 | 121 |
| | | 0.25 | 1000 | 2700 | 600 | 57 |
| | | 0.125 | 950 | 2050 | 500 | 47 |
| 14 | α-bromoacetophenone | 0.50 | 600 | 2500 | 650 | 202 |
| | | 0.25 | 950 | 2500 | 600 | 45 |
| | | 0.125 | 800 | 2250 | 600 | 47 |
| 15 | Bromoacetic Acid | 0.50 | 500 | 2350 | 700 | 206 |
| | | 0.25 | 1050 | 2500 | 570 | 55 |
| | | 0.125 | 1000 | 2350 | 550 | 50 |
| 16 | Cinnamyl Bromide | 0.50 | 850 | 2750 | 650 | 74 |
| | | 0.25 | 950 | 2500 | 500 | 53 |
| | | 0.125 | 830 | 2000 | 500 | 55 |
| 17 | 1,4-dibromo-2-butene | 0.50 | 900 | 2500 | 600 | 88 |
| | | 0.25 | 1100 | 2400 | 550 | 50 |
| | | 0.125 | 930 | 1880 | 500 | 27 |
| 18 | Zinc Bromide (1) | 0.50 | 1100 | 2700 | 550 | 49 |
| | | 0.25 | 1200 | 2550 | 500 | 46 |
| | | 0.125 | 1000 | 2180 | 550 | 46 |
| 19 | Aluminum Bromide | 0.50 | 1000 | 2550 | 550 | 60 |

(1) dissolved in isopropanol to give a 33% by weight solution

T = stock tearing

EXAMPLE 11

A vulcanizate of chlorobutyl/natural rubber was prepared according to the procedure of Example 1. The formulation for such a rubber blend is found in Table VI. Tensile strength and dynamic stability of this rubber blend were measured by conventional means, and the data set forth in Table VII below.

TABLE VI

Formulation of Chlorobutyl/Natural Rubber Vulcanizate

| | Parts per Hundred |
|---|---|
| Chlorobutyl | 50.0 |
| RSS No. 1 (natural rubber) | 50.0 |
| HAF Black | 35.0 |
| Circosol 4240 oil | 5.0 |
| Age Rite Stalite (1) | 1.0 |
| Stearic Acid | 1.5 |
| ZnO | 5.0 |
| Sulfur | 1.5 |
| MBTS | 1.0 |

Press cured for 30 minutes at 153°C.
(1) Mixture of alkylated diphenylamines.

The above table shows that tensile strength and dynamic stability of a blend of chlorobutyl with natural rubber is improved by the addition of the bromine-containing compounds of this invention. It is also apparent from this data that as the mole % of bromine to chlorine decreases, the compatibility of chlorobutyl to natural rubber decreases.

EXAMPLE 20

A vulcanizate of claim 11 was prepared, except an iodine-containing compound was added to the composition during the milling stage. The rubber composition was also cured for 30 minutes at 153°C. The following table shows the ability of an iodine compound of this invention to increase the compatibility of chlorobutyl to natural rubber

TABLE IX

Effect on Tensile Strength and Dynamic Stability by Addition of Iodoacetic Acid in Chlorobutyl/Natural Rubber Blends

| Moles of Iodine per mole of Chlorine | 300% Modulus, psi | Tensile Strength, psi | Elongation % | Kilocycles to Rupture |
|---|---|---|---|---|
| 0.25 | 930 | 2450 | 550 | 64 |

It is to be understood that this invention is not restricted to the foregoing examples which serve only to illustrate the present invention. Numerous variations may be devised without departing from the scope of this invention.

What is claimed is:

1. A composition of matter comprising a chlorinated low unsaturation rubber and a halogen-containing $C_1$ to $C_{30}$ organic compound wherein the halogen is bonded to a carbon atom, wherein said carbon atom is bonded to 1 to 3 functional groups capable of stabilizing the positive charge at the halogen-carbon bond, and wherein the halogen is selected from the group consisting of bromine or iodine.

2. The composition of claim 1 wherein the functional group is selected from the group consisting of nitrile, carboxyl, aryl, vinyl and carbonyl.

3. The composition of claim 1 wherein the halogen-containing compound is selected from the group consisting of diethylbromomalonate, α-bromoacetophenone, bromoacetic acid, cinnamyl bromide, 1,4-dibromo-2-butene, and iodoacetic acid.

4. The composition of claim 1 wherein at least 0.125 moles of halogen is present for each mole of chlorine present in the rubber.

5. The composition of claim 1 wherein said composition contains a high unsaturation rubber, having at least 30 mole % unsaturation.

6. The composition of claim 5 wherein the high unsaturation rubber is selected from the group consisting of natural rubber, styrene-butadiene rubber, polybutadiene, polyisoprene, polychloroprene, and mixtures thereof.

7. A composition of matter comprising a chlorinated low unsaturation rubber, and a bromine-containing Lewis acid inorganic compound.

8. The composition of claim 7 wherein at least 0.125 moles of bromine is present per mole of chlorine.

9. The composition of claim 7 wherein the Lewis acid is selected from the group consisting of aluminum bromide, and zinc bromide.

10. The composition of claim 7 wherein said composition contains a high unsaturation rubber, having at least 30 mole % unsaturation.

11. The composition of claim 10 wherein the high unsaturated rubber is selected from the group consisting of natural rubber, styrene butadiene rubber, polybutadiene, polyisoprene, polychloroprene, and mixtures thereof.

12. A method of preparing a chlorinated low unsaturation rubber having improved adhesion which comprises reacting said rubber with at least one halogen-containing organic compound, wherein the halogen is bonded to a carbon atom, which is in turn bonded to 1 to 3 functional groups capable of stabilizing a positive charge at the halogen-carbon bond, and wherein the halogen is selected from the group consisting of bromine and iodine.

13. The method of claim 12 wherein the functional group is selected from the group consisting of nitrile, carboxyl, aryl, vinyl and carbonyl.

14. The method of claim 12 wherein a halogen-containing compound is selected from the group consisting of diethylbromomalonate, α-bromoacetophenone, bromoacetic acid, cinnamyl bromide, 1,4-dibromo-2-butene and iodoacetic acid.

15. The method of claim 12 wherein at least 0.125 mole of halogen is present per mole of chlorine.

16. A method of preparing a chlorinated low unsaturation rubber having improved adhesion which comprises reacting said rubber with bromine-containing Lewis acid.

17. The method of claim 12 wherein at least 0.125 moles of bromine is present per mole of chlorine.

* * * * *